United States Patent
Schlecht et al.

(10) Patent No.: US 6,984,170 B2
(45) Date of Patent: Jan. 10, 2006

(54) COVER PLATE DEVICE FOR A HEAT EXCHANGER DEVICE, ESPECIALLY FOR A VEHICLE HEATER

(75) Inventors: Patric Schlecht, Ostfildern (DE); Jürgen Wagner, Plochingen (DE); Andreas Collmer, Ostfildern (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 33 days.

(21) Appl. No.: 10/348,409

(22) Filed: Jan. 21, 2003

(65) Prior Publication Data

US 2003/0166391 A1 Sep. 4, 2003

(30) Foreign Application Priority Data

Mar. 1, 2002 (DE) .......................... 102 08 852

(51) Int. Cl.
*B60S 1/54* (2006.01)

(52) U.S. Cl. .................. 454/126; 454/261; 165/41; 165/42

(58) Field of Classification Search ................. 454/121, 454/126, 156, 159, 160; 165/41, 42; 237/12.3 B
See application file for complete search history.

(56) References Cited

U.S. PATENT DOCUMENTS

| 2,973,033 | A | | 2/1961 | Patrick |
| 3,614,948 | A | | 10/1971 | Jackson et al. |
| 4,223,754 | A | * | 9/1980 | Mizuno et al. ............... 180/90 |
| 4,531,671 | A | * | 7/1985 | Schwenk .................... 454/121 |
| 6,083,099 | A | * | 7/2000 | Brown ....................... 454/121 |
| 6,482,081 | B2 | * | 11/2002 | Vincent et al. ............. 454/121 |
| 6,533,025 | B1 | * | 3/2003 | Krogmeier et al. ........... 165/41 |
| 2002/0070010 | A1 | | 6/2002 | Hakkinen et al. |

FOREIGN PATENT DOCUMENTS

| DE | 15 54 729 A | 4/1970 |
| DE | 199 51 1714 | 5/2001 |

\* cited by examiner

*Primary Examiner*—Derek S. Boles
(74) *Attorney, Agent, or Firm*—McGlew and Tuttle, P.C.

(57) ABSTRACT

A cover plate device for a heat exchanger device, especially for a vehicle heater, includes a receiving zone (14) intended to be arranged on the heat exchanger device and to receive a fluid stream leaving the heat exchanger device in a first direction of flow ($S_1$), a mixing zone (22) for mixing the partial fluid streams ($F_1$, $F_2$, $F_3$) leaving the heat exchanger device in different areas and entering the receiving zone (14), and at least two delivery zones (24, 26) for delivering the fluid stream leaving the mixing zone (22) from the cover plate device (10).

11 Claims, 2 Drawing Sheets

COVER PLATE DEVICE FOR A HEAT EXCHANGER DEVICE, ESPECIALLY FOR A VEHICLE HEATER

FIELD OF THE INVENTION

The present invention pertains to a cover plate device for a heat exchanger device, especially for a vehicle heater.

BACKGROUND OF THE INVENTION

In heat exchanger devices used in vehicle heaters, a medium to be heated, e.g., air used to heat the interior space of a vehicle, flows through a heat exchanger device approximately in the axial direction relative to the longitudinal axis of the heat exchanger, and it leaves the heat exchanger device at an outlet cross-sectional surface in an end area of same. To ensure the most uniform distribution possible in the interior space of a vehicle, the heated air must then be led to a plurality of outlet nozzles. To distribute the heated air leaving the heat exchanger into a plurality of flow channels, it is possible to attach to the end of the heat exchanger a T-piece-like cover, into which the air leaving the heat exchanger enters and which will then distribute this air into two channel areas. Since the air stream leaving the heat exchanger does not have a uniform temperature distribution, such an arrangement leads, in general, to the problem that the channel areas supplied receive air with different temperatures during the distribution of the air stream collected at first in the T-piece, which runs counter to the requirement of the most uniform heating possible of the interior space of the vehicle.

SUMMARY OF THE INVENTION

The object of the present invention is to provide a cover plate device for a heat exchanger device, especially for a vehicle heater, which makes possible the uniform distribution of the fluid stream leaving the heat exchanger device, namely, a distribution that is especially also uniform with respect to the temperature.

According to the present invention, this object is accomplished by a cover plate device for a heat exchanger device, especially for a vehicle heater, comprising a receiving zone for arrangement at the heat exchanger device and for receiving a fluid stream leaving the heat exchanger device in a first direction of flow, a mixing zone for mixing the fluid streams leaving the heat exchanger device at different areas and entering the fluid receiving zone, at least two delivery zones for delivering the fluid stream leaving the mixing zone from the cover plate device.

A mixing zone, which ensures that the temperature stratification of the fluid stream leaving the heat exchanger device is eliminated and a total fluid stream of an approximately homogeneous temperature is sent to the different delivery zones, is provided in the cover plate device according to the present invention.

According to an especially advantageous aspect of the present invention, the mixing of the different partial fluid streams is achieved in the mixing zone by the mixing zone comprising a first flow channel area, which leads away from the receiving zone essentially at right angles to the first direction of flow. By draining off the fluid stream laterally— in relation to the first direction of flow—very good mixing of the partial fluid streams forming the total fluid stream is achieved due to the flow deflection necessary for this. The mixing zone can make an additional contribution to this by providing a smaller flow cross-sectional area than the receiving zone.

According to an advantageous aspect of the cover plate device according to the present invention, provisions may be made for a first of the delivery zones to have a second flow channel area, which is arranged horizontally at least in some sections next to the first flow channel area of the mixing zone. This can be achieved in terms of design in a very simple manner by the mixing zone being separated from the first delivery zone by a partition section.

The distribution of the total fluid stream leaving the mixing zone among the different delivery zones can be affected in a defined manner by the first flow channel area essentially predetermining a second direction of flow for the fluid stream flowing through the mixing zone, which said second direction of flow is approximately opposite a third direction of flow, which is predetermined by the second flow channel area of the first of the delivery zones for the partial fluid stream entering these zones. Furthermore, provisions may be made for a second of the delivery zones to have a third flow channel area, which adjoins the first flow channel area of the mixing zone and predetermines a fourth direction of flow for this entering partial fluid stream, the fourth direction of flow approximately corresponding to the second direction of flow of the fluid stream flowing through the mixing zone. It is advantageous in this case for the third direction of flow to be directed essentially opposite the fourth direction of flow.

The distribution of the total fluid stream leaving the mixing zone can be additionally affected by the second flow channel area and the third flow channel area having different flow cross-sectional areas. Provisions may be made in this case for the second flow channel area to have a smaller flow cross-sectional area than the third flow channel area.

According to another advantageous aspect of the present invention, the cover plate device may be designed such that it has a basic body designed to be connected to a heat exchanger device, in which at least one of the delivery zones is designed as an integral component, and at least one additional delivery zone is provided essentially by an attachment that can be arranged on the basic body.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
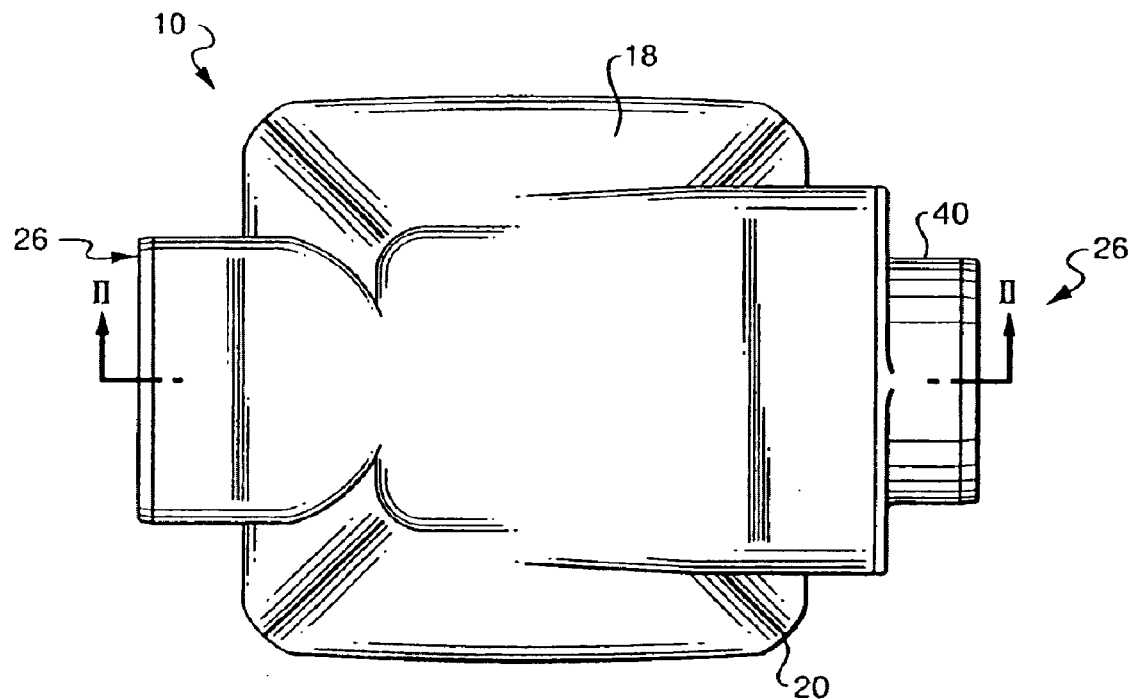
FIG. 1 is a top view of a cover plate device according to the present invention.

Referring to the drawings in particular, a cover plate according to the present invention for a heat exchanger device of a vehicle heater is designated in the figures in general by the reference number 10. The cover plate 10 comprises an essentially cylindrical connection section 12, which has an approximately rectangular or square cross section and is configured to be arranged at the axially open end area of a heat exchanger housing 11. This connection section 12 forms a receiving zone 14, into which the fluid stream leaving the heat exchanger device enters in a first direction of flow $S_1$. On the axial end side located opposite an inlet opening 16, the receiving zone 14 is closed by a closing wall 18 of a basic body 20 of the cover plate device 10. The fluid stream entering the receiving zone 14 is forced by this axial closure to be laterally deflected and to flow into a mixing zone designated generally by 22. The fluid stream leaving the mixing zone 22 is split into two partial flows, one of which enters a first delivery zone 24, while the other enters a second delivery zone 26.

Figure 2:
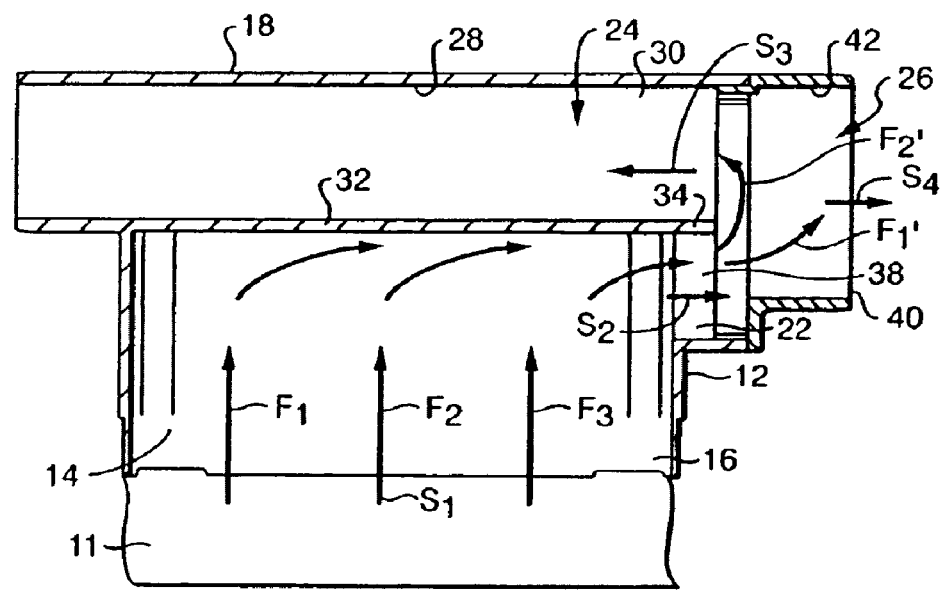
FIG. 2 is a longitudinal sectional view of the cover plate device shown in FIG. 1, cut along a line I—I.
Figure 3:
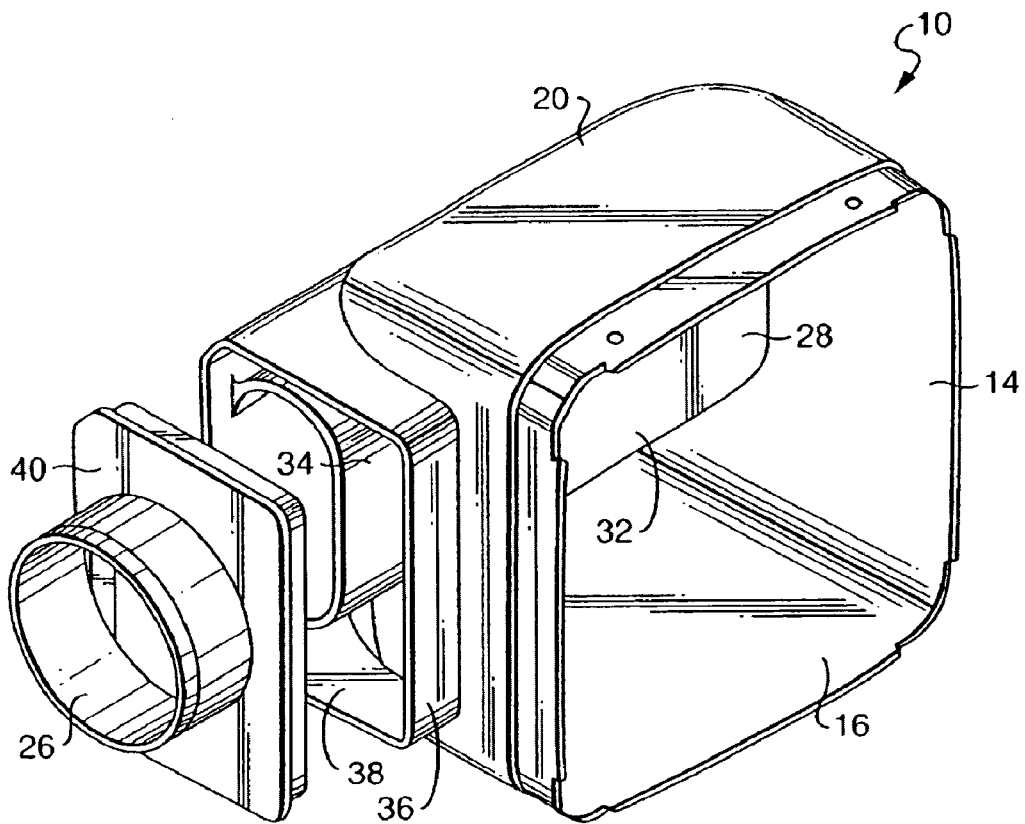
FIG. 3 is a perspective exploded view of the cover plate device according to the present invention from the underside.
Figure 4:
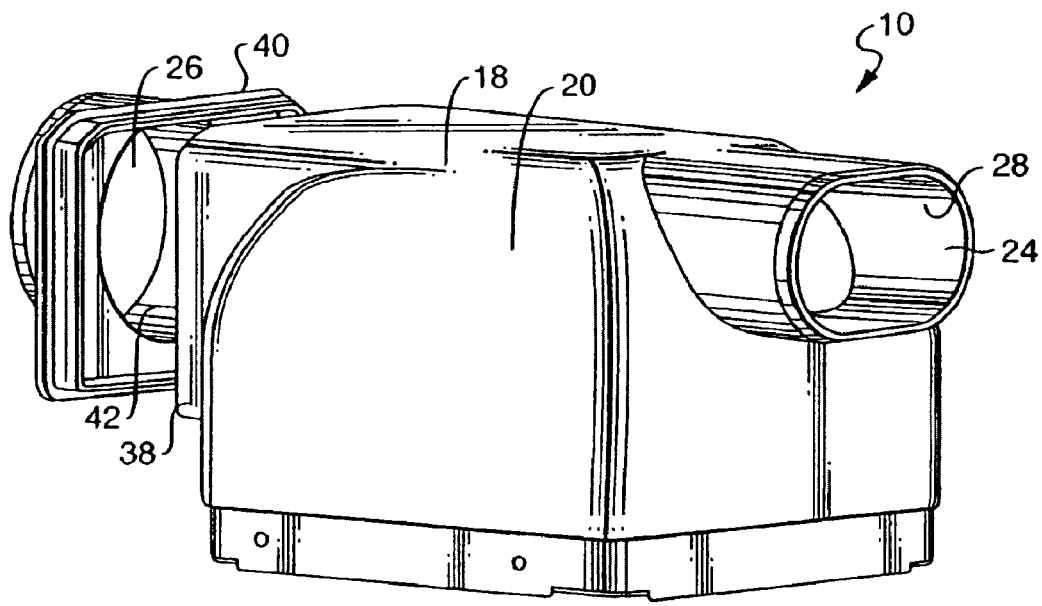
FIG. 4 is another perspective exploded view of the cover plate device according to the present invention as viewed from one side.

It can be recognized in FIGS. 2 and 3 that a flow channel area 28 directed approximately at right angles to the first direction of flow $S_1$ is provided on the side of the basic body 20 located opposite the inlet opening 16, being made integrally with the basic body. The flow channel area 28 is located next to the mixing zone 22 in an axial end area 30. A wall 32 that also closes the flow channel area 28 toward the receiving zone 14 separates the mixing zone 22 from the first delivery zone 24 or the flow channel area 28 with a wall section 34. The mixing zone is consequently defined essentially by the wall section 34 and another wall section 36, which is provided at the basic body 20 and surrounds the wall section 34, so that an additional flow channel area 38 is formed between the two wall sections 34 and 36, and the fluid stream leaving the receiving zone 14 flows through the additional flow channel area 38 approximately in a second direction of flow $S_2$, which is approximately at right angles to the first direction of flow $S_1$, in which the fluid stream enters the receiving zone 14. It is apparent that other flow direction components may also be present due to the deflection. The trend of the direction of flow or the prevailing direction of flow in the different zones is significant here.

The flow channel area 38 has essentially a flow cross-sectional area that is formed by the difference between the flow cross-sectional area surrounded by the wall area 36 and the flow cross-sectional area surrounded by the wall area 34 in the embodiment being shown. It can be recognized especially from FIG. 3 that the flow cross-sectional area provided for the flow channel area 38 is markedly smaller than the flow cross-sectional area of the receiving zone 14 in the area of its inlet opening 16. It is achieved due to the throttling effect of the flow channel area 38, which is consequently present here, and the forced deflection of the fluid stream that the partial fluid streams $F_1$, $F_2$, $F_3$, etc., which enter the receiving zone 14 in different areas of the inlet opening 16 and which are, of course, to be considered to be different volume areas of the total fluid stream here and which will, in general, carry fluid with different temperatures, will be mixed with each other very thoroughly, so that the fluid stream leaving the mixing zone 22 will have a highly homogeneous temperature. As was explained above, the fluid stream leaving the mixing zone 22 is split into two partial flows $F'_1$ and $F'_2$. While the partial flow $F'_2$ is deflected by about 180° due to the fact that the flow channel area 28 for the fluid guided in it predetermines a third direction of flow $S_3$, which is approximately opposite the second direction of flow $S_2$ in the mixing zone 22, the partial fluid stream $F'_1$ entering the delivery zone 26 enters this zone approximately without a deflection of its direction and is passed on from this zone essentially in a fourth direction of flow $S_4$. It shall be pointed out that this second delivery zone 26 is provided essentially by an attachment 40, which is attached to the wall area 36 of the basic body 20 or is inserted into the wall area. The division into a basic body 20, on the one hand, and the attachment 40, on the other hand, is advantageous for manufacturing technological reasons, because the particular necessary mold release bevel can be provided on both of these components. It shall be pointed out that a different separation into two essentially mutually symmetrical half shells is also possible. The attachment 40 reduces the flow cross-sectional area to an approximately round shape with a smaller area dimension than the flow cross-sectional area surrounded by the wall section 36. In particular, the attachment 40 defines another flow channel area 42 of the second delivery zone 26.

Various measures may be taken to split the fluid stream leaving the mixing zone 22 with homogeneous temperature distribution in a defined manner between the two flow channel areas 28, 42. On the one hand, the ratio of the cross-sectional dimension of the flow channel area 28 to the cross-sectional dimension of the flow channel area 42 does, of course, play an essential role for the quantitative splitting into the two partial flows $F'_2$, $F'_1$. Another essential role is played by the length of the wall section 34. The farther this wall section 34 is pulled in the direction of the second delivery zone 26, i.e., in the direction of the flow channel area 42, the smaller the percentage of the heated air transferred into the partial flow $F'_2$ becomes.

The two flow channel areas 28, 42 in the basic body 20 and in the attachment 40 form junction areas at their free end areas, to which air guide channels are then joined in order to send the heated air to different discharge nozzles in the interior space of the vehicle. Due to the requirement that the air should be distributed as uniformly as possible, i.e., that it should be ensured in the areas of the different discharge nozzles that equal amounts of air will be discharged from these nozzles, it is advantageous to have the flow channel area 42 with larger flow cross-sectional area, i.e., lower flow resistance, joined by a channel system that leads to nozzles located farther away and thus offers as a whole a higher flow resistance. The flow channel area 28 can now be joined by a channel system that leads to nozzles located closer to the heater. It is also ensured in this manner, besides the above-described homogenization of the temperature for the two partial flows $F'_2$ and $F'_1$ delivered, that the different flow conditions and flow resistances are taken into account by providing different amounts of air, and the delivery of uniform amounts of air or of defined, predetermined amounts of air can thus also be achieved in the entire interior space of the vehicle, besides the delivery of uniformly warm air streams.

The present invention provides a cover plate device which can be manufactured, e.g., from plastic or even metal materials in a very simple manner and which ensures improved heat release characteristics based, among other things, on its internal design. It shall be pointed once again that, above all, the different directions of flow described define essentially principal trends of the flow in different areas, but different partial flows may also have different directions of flow or flow direction components in the different flow channel areas or zones.

While a specific embodiment of the invention has been shown and described in detail to illustrate the application of the principles of the invention, it will be understood that the invention may be embodied otherwise without departing from such principles.

What is claimed is:

1. A cover plate device for a heat exchanger device or a vehicle heater heat exchanger device, comprising:

a portion defining a receiving zone to be arranged at the heat exchanger device and to receive partial fluid streams leaving the heat exchanger device in a first direction of flow;

a portion defining a mixing zone for mixing the partial fluid streams leaving the heat exchanger device in different areas and entering the receiving zone, the mixing zone comprising a first flow channel area providing a second direction of flow; and a portion defining a first delivery zone and a second delivery zone for delivering the fluid stream leaving the mixing zone, said first delivery zone comprising a second flow channel area and said second delivery zone comprising a third flow channel area, said third flow channel area join the first flow channel area and predetermining another direction of flow for the fluid stream entering said second of the delivery zones, said another direction of flow approximately corresponding to said second direction of flow.

2. A cover plate device in accordance with claim 1, wherein the said first flow channel area leads away from the receiving zone essentially at right angles to the first direction of flow.

3. A cover plate device in accordance with claim 1, wherein the mixing zone has a smaller flow cross-sectional area than the receiving zone.

4. A cover plate device in accordance with claim 1, wherein the delivery zones include a first delivery zone having said second flow channel area arranged horizontally at least in some sections next to a first flow channel area of the mixing zone.

5. A cover plate device in accordance with claim 4, wherein the mixing zone is separated from the first delivery zone by a partition section.

6. A cover plate device in accordance with claim 4, wherein the first flow channel area predetermines essentially the second direction of flow for the fluid stream flowing through the mixing zone and the second direction of flow is approximately opposite the third direction of flow predetermined by the second flow channel area of the first of the delivery zones for the partial fluid stream entering the delivery zones.

7. A cover plate device in accordance with claim 1, wherein the third direction of flow is directed essentially opposite the another direction of flow.

8. A cover plate device in accordance with claim 1, wherein the second flow channel area and the third flow channel area have different flow cross-sectional areas.

9. A cover plate device in accordance with claim 8, wherein the second flow channel area has a smaller flow cross-sectional area than the third flow channel area.

10. A cover plate device in accordance with claim 1, wherein the cover plate device has a basic body, which is designed to be connected to a heat exchanger device and in which at least one of the delivery zones is designed as an integral part, and at least one other of the delivery zones is provided essentially by an attachment to be arranged on the basic body.

11. A cover plate device for a heat exchanger device or a vehicle heater heat exchanger device, comprising:

a portion defining a receiving zone to be arranged at the heat exchanger device and to receive a partial fluid streams leaving the heat exchanger device in a first direction of flow;

a portion defining a mixing zone for mixing the partial fluid streams leaving the heat exchanger device in different areas and entering the receiving zone, said mixing zone including a first flow channel area leading away from the receiving zone, said first flow channel area predetermines essentially a second direction of flow for the fluid stream flowing through the mixing zone;

a portion defining at least two delivery zones for delivering the fluid stream leaving the mixing zone, the delivery zones including a first delivery zone having a second flow channel area, said second flow channel area predetermining a third direction of flow, a second of the delivery zones having a third flow channel area, which joins the first flow channel area of the mixing zone and predetermines a fourth direction of flow for the fluid stream entering it, the fourth direction of flow approximately corresponding to the second direction of flow of the fluid stream flowing through the mixing zone.

* * * * *